US010464005B2

(12) United States Patent
Tanaka

(10) Patent No.: US 10,464,005 B2
(45) Date of Patent: Nov. 5, 2019

(54) PNEUMATIC FILTER AND FILTER ELEMENT

(71) Applicant: SMC CORPORATION, Chiyoda-ku (JP)

(72) Inventor: Takayuki Tanaka, Tsukuba (JP)

(73) Assignee: SMC CORPORATION, Chiyoda-ku (JP)

( * ) Notice: Subject to any disclaimer, the term of this patent is extended or adjusted under 35 U.S.C. 154(b) by 148 days.

(21) Appl. No.: 15/572,387

(22) PCT Filed: Apr. 26, 2016

(86) PCT No.: PCT/JP2016/062990
§ 371 (c)(1),
(2) Date: Nov. 7, 2017

(87) PCT Pub. No.: WO2016/181820
PCT Pub. Date: Nov. 17, 2016

(65) Prior Publication Data
US 2018/0117517 A1    May 3, 2018

(30) Foreign Application Priority Data

May 11, 2015   (JP) ................................ 2015-096629

(51) Int. Cl.
*B01D 41/00*   (2006.01)
*B01D 46/24*   (2006.01)
(Continued)

(52) U.S. Cl.
CPC ..... *B01D 46/2414* (2013.01); *B01D 46/0005* (2013.01); *B01D 46/0039* (2013.01);
(Continued)

(58) Field of Classification Search
CPC ............ B01D 46/2414; B01D 46/0005; B01D 46/0039; B01D 46/521; B01D 2275/10;
(Continued)

(56) References Cited

U.S. PATENT DOCUMENTS 4,105,561 A * 8/1978 Domnick ............. B01D 17/045
  210/232
4,516,994 A * 5/1985 Kocher .................. B01D 45/12
  210/304

(Continued)

FOREIGN PATENT DOCUMENTS

JP   60-9524 U    1/1985
JP   60-74723 U   5/1985
(Continued)

OTHER PUBLICATIONS

International Search Report dated Aug. 2, 2016 in PCT/JP2016/062990 filed Apr. 26, 2016.

*Primary Examiner* — Dung H Bui
(74) *Attorney, Agent, or Firm* — Oblon, McClelland, Maier & Neustadt, L.L.P.

(57) ABSTRACT

An upper end cap including an inner filter member that surrounds a middle space portion, an outer filter member that surrounds the inner filter member, and an introduction port for introducing compressed air into the middle space portion, and a lower end cap that closes a lower end portion of the middle space portion, an outer periphery of a lower end portion of the inner filter member being surrounded by an inner wall, an outer periphery of a lower end portion of the outer filter member being surrounded by an outer wall, an upper end surface of the outer wall being positioned higher than an upper end surface of the inner wall, a liquid discharge passage being formed between the outer wall and the inner wall, the liquid discharge passage being in com-
(Continued)

munication with a liquid discharge hole that open to an underside of the lower end cap.

11 Claims, 7 Drawing Sheets

(51) Int. Cl.
  *B01D 46/52* (2006.01)
  *B01D 46/00* (2006.01)
  *B01D 46/10* (2006.01)
(52) U.S. Cl.
  CPC ............ *B01D 46/521* (2013.01); *B01D 46/10* (2013.01); *B01D 2267/40* (2013.01); *B01D 2271/027* (2013.01); *B01D 2273/28* (2013.01); *B01D 2275/10* (2013.01)
(58) Field of Classification Search
  CPC ................. B01D 2267/40; B01D 2273/28; B01D 46/10; B01D 2271/027
  See application file for complete search history.

(56) References Cited

U.S. PATENT DOCUMENTS

| | | | | |
|---|---|---|---|---|
| 5,145,497 | A | 9/1992 | Maeda | |
| 5,152,890 | A * | 10/1992 | Linnersten | B01D 29/15 210/315 |
| 5,180,490 | A * | 1/1993 | Eihusen | B01D 27/08 210/239 |
| 5,833,843 | A * | 11/1998 | Covington | B01D 27/06 210/130 |
| 6,068,762 | A * | 5/2000 | Stone | B01D 29/21 210/90 |
| 7,704,397 | B2 * | 4/2010 | Meddock | B01D 27/10 210/338 |
| 8,986,539 | B2 * | 3/2015 | Herman | B01D 29/232 210/137 |
| 2003/0226793 | A1 * | 12/2003 | Merritt | B01D 29/15 210/206 |
| 2005/0035042 | A1 * | 2/2005 | Rowe | B01D 35/153 210/234 |
| 2005/0235617 | A1 * | 10/2005 | Read | B01D 46/0005 55/423 |
| 2008/0245719 | A1 * | 10/2008 | Beard | B01D 29/114 210/235 |
| 2010/0154371 | A1 * | 6/2010 | Bittle | B01D 46/2411 55/502 |
| 2010/0288688 | A1 * | 11/2010 | Bryson | B01D 27/103 210/254 |
| 2011/0078508 | A1 | 3/2011 | Komatsu et al. | |
| 2012/0055126 | A1 * | 3/2012 | Whittier | B01D 46/0024 55/414 |
| 2013/0008839 | A1 * | 1/2013 | Wilkendorf | B01D 29/606 210/90 |
| 2014/0284265 | A1 * | 9/2014 | Sann | B01D 29/21 210/450 |
| 2015/0258484 | A1 * | 9/2015 | Jakop | B01D 46/2414 55/510 |
| 2016/0184744 | A1 * | 6/2016 | Jakop | B01D 46/0005 417/313 |

FOREIGN PATENT DOCUMENTS

| | | |
|---|---|---|
| JP | 4-110118 U | 9/1992 |
| JP | 7-501479 A | 2/1995 |
| JP | 2010-221399 A | 10/2010 |
| JP | 2011-218252 A | 11/2011 |
| WO | 93/10881 A1 | 6/1993 |
| WO | 2005/105266 A1 | 11/2005 |

* cited by examiner

PNEUMATIC FILTER AND FILTER ELEMENT

TECHNICAL FIELD

The present invention relates to a pneumatic filter for removing dust, liquid, and the like mixed in compressed air, and a filter element employed in the pneumatic filter.

BACKGROUND ART

In a case in which a pneumatic actuator, such as a pneumatic cylinder or a pneumatic motor, is actuated by compressed air, using clean compressed air in which dust and liquid, such as oil contents and water contents, are not mixed is required. Accordingly, a pneumatic filter for removing foreign matters, such as dust and liquid, from the compressed air is typically used in a pneumatic circuit that supplies compressed air to the pneumatic actuator.

As disclosed in Patent Literature 1, for example, a pneumatic filter has a configuration in which a filter body for removing foreign matters is housed inside a filter case including an inlet port and an outlet port. The filter body includes a hollow filter member, and an upper cap and a lower cap attached to an upper end and a lower end of the filter member, the upper cap includes a communication hole for communicating the inlet port and the hollow portion of the filter member to each other, and the lower cap functions to close a lower end portion of the hollow portion of the filter member.

Furthermore, when compressed air from the inlet port is supplied into the hollow portion of the filter member through the communication hole of the upper cap, the compressed air is filtered while passing through the inside to the outside of the filter member removing the foreign matters, and the purified compressed air flows out from the outlet port.

Meanwhile, liquid, such as oil contents and water contents, separated from the compressed air gradually develops into large liquid particles by repeated merging of small particles while flowing down along the filter member, flows down to the inside of the lower cap after being temporarily retained therein, sequentially drips into the filter case from the lower cap, and is discharged as drain.

However, in conventional pneumatic filters, in a case in which the flow velocity of the compressed air is high, in portions near the lower end portion of the filter member and near the upper surface of the lower cap, liquid contained in the filter member at high density and liquid accumulated inside the lower cap come in contact with the fast flow of the compressed air and are scattered causing a problem in that the compressed air that has been purified is easily mixed again. In particular, when the liquid inside the lower cap flows over the lower cap, the liquid on the edge of the lower cap is easily scattered by the flow of compressed air.

Incidentally, Patent Literature 2 discloses a filter element that can overcome such a problem. The filter element disposes, on the inside and the outside in a dual manner, a hollow filter layer with a small diameter that removes dust, and a hollow drain layer with a large diameter that collects liquid, an upper cap and a lower cap are attached to upper ends and lower ends of the filter layer and the drain layer, and a lower end portion of the drain layer is extended so as to cover a portion of the lower cap from a lateral side of the outer periphery to an underside.

In the filter element, when liquid is collected in the drain layer while the compressed air passes through the filter tank to the drain layer, since the liquid flows downwards along the drain layer and drips from a drain layer portion positioned on the underside of the lower cap, there is no contact with the flow of the compressed air and, accordingly, mixing into the compressed air once more is prevented.

However, in the filter element, since the lower end portion of the drain layer needs to be formed into a special shape covering a portion of the lower cap from the outer periphery of the lateral side to the underside, there is a drawback in that work and cost are required in manufacturing the filter element. When deforming a uniform cylindrical drain layer into the above shape, wrinkles easily occur such that the above work is very troublesome.

CITATION LIST

Patent Literature

Patent Literature 1: Japanese Unexamined Patent Application Publication No. 7-328364

Patent Literature 2: U.S. Pat. No. 7,390,342

SUMMARY OF INVENTION

Technical Problem

The technical problem of the present invention is to provide a pneumatic filter and a filter element that have a simple configuration and that are capable of reliably preventing liquid that has been collected by the filter member from being mixed again into the compressed air that has been purified even when the flow velocity of the filtered compressed air is high.

Solution to Problem

In order to overcome the above problem, the present invention provides a hollow filter element for removing dust and liquid mixed in the compressed air.

The filter element includes an inner filter member that surrounds a middle space portion, and an outer filter member that surrounds an outer periphery of the inner filter member, and is configured such that compressed air introduced into the middle space portion is filtered while passing through the inner filter member to the outer filter member such that dust and liquid are removed.

An upper end cap including an introduction port for introducing compressed air into the middle space portion is attached to upper end portions that are first ends of the inner filter member and the outer filter member in an axis direction, and a lower end cap that closes a lower end portion of the middle space portion is attached to lower end portions that are second ends of the inner filter member and the outer filter member in the axis direction.

An outer periphery of the lower end portion of the inner filter member is surrounded by an inner wall formed in the lower end cap, an outer periphery of the lower end portion of the outer filter member is surrounded by an outer wall that blocks a flow of the compressed air, and an upper end surface of the outer wall is positioned higher than an upper end surface of the inner wall. Furthermore, a liquid discharge passage for discharging liquid collected by the inner filter member and the outer filter member to an outside is formed between the outer wall and the inner wall, and the liquid discharge passage is in communication with a liquid discharge hole that opens to an underside of the lower end cap.

Furthermore, according to the present invention, a pneumatic filter in which a housing including a head including an inlet port and an outlet port and a hollow housing body connected to the head, and in which a hollow filter element is housed inside the housing body so that an axis is oriented vertically is provided.

According to a preferred configuration and mode of the present invention, in the filter element, the lower end portion of the outer filter member is positioned higher than the lower end portion of the inner filter member, and, is positioned at a position similar to that of the upper end surface of the inner wall.

Furthermore, preferably, a vertical width of a wall portion of the outer wall that surrounds an outer periphery of the outer filter member above the inner wall is similar to or larger than a vertical width of a wall portion of the inner wall surrounding an outer periphery of the inner filter member.

Furthermore, a gap in communication with the liquid discharge passage may be formed between an inner peripheral surface of the outer wall and an outer peripheral surface of the outer filter member.

In the present invention, preferably, the outer wall is formed in the lower end cap so as to surround the inner wall, and the outer wall and the inner wall are connected to each other with a radially disposed plurality of rib-shaped connection walls.

Furthermore, the lower end cap may include an inner cap member and an outer cap member that are configured separately and that fit with each other, the inner wall may be formed in the inner cap member, and the outer wall and the liquid discharge hole may be formed in the outer cap member.

In such a case, the outer cap member can also serve as a support block that supports a lower end portion of the filter element.

Advantageous Effects of Invention

According to the present invention, the flow of compressed air passing through the inner filter member to the outer filter member is blocked by the outer wall surrounding the outer periphery of the lower end portion of the outer filter member near the inner filter member and the lower end portion of the outer filter member and the flow velocity thereof is decreased, and a high-density liquid contained near the inner filter member and the lower end portion of the outer filter member and liquid accumulated inside the lower end cap do not come in contact and are scattered by the flow of compressed air, and as a result, liquid can be reliably prevented from becoming mixed into the compressed air that has been purified.

DESCRIPTION OF EMBODIMENTS

Figure 1:
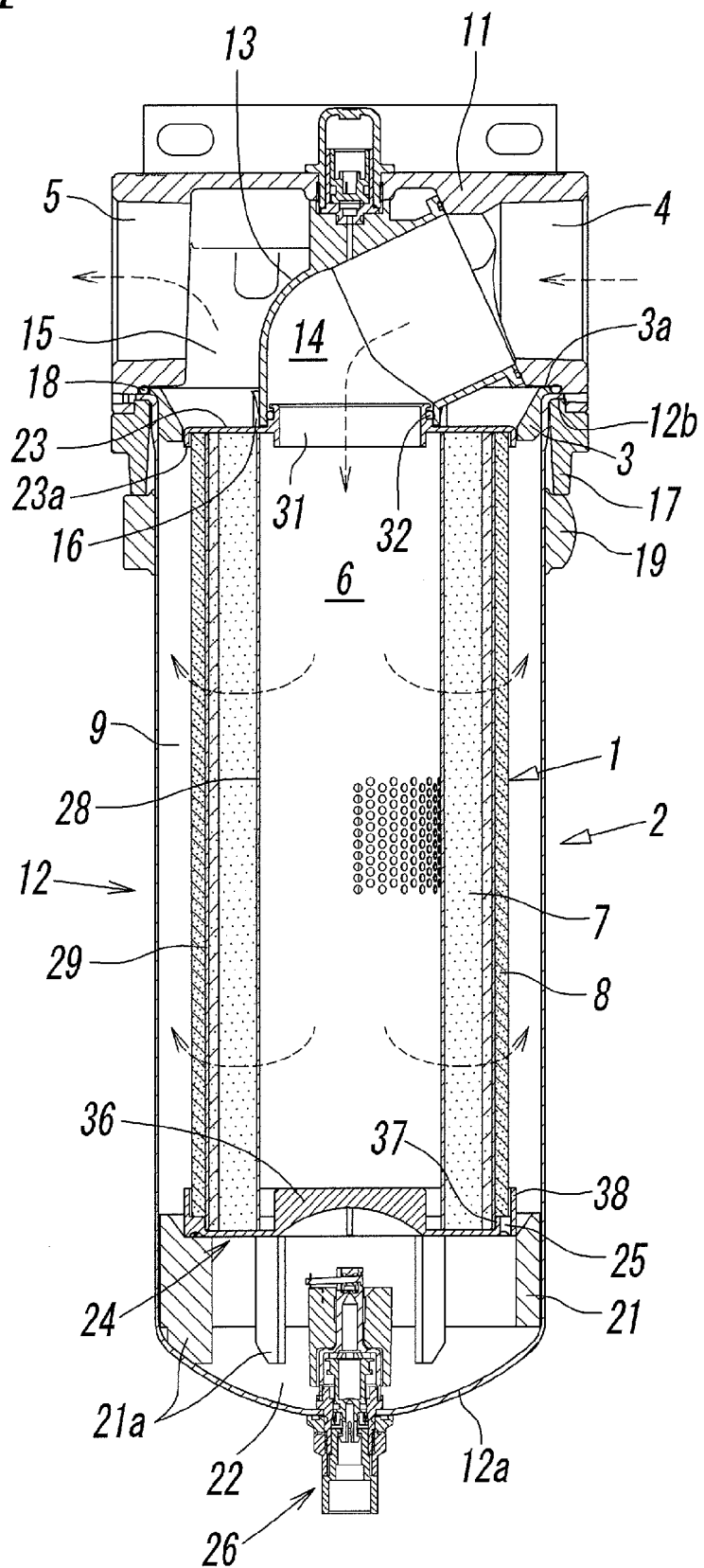
FIG. 1 is a cross-sectional view illustrating an embodiment of a pneumatic filter according to the present invention.
Figure 2:
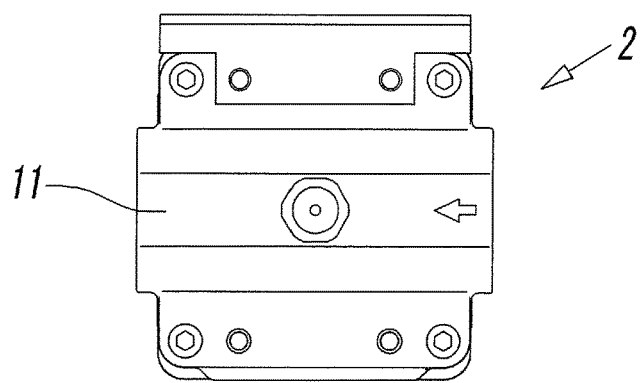
FIG. 2 is a plan view of FIG. 1.
Figure 3:
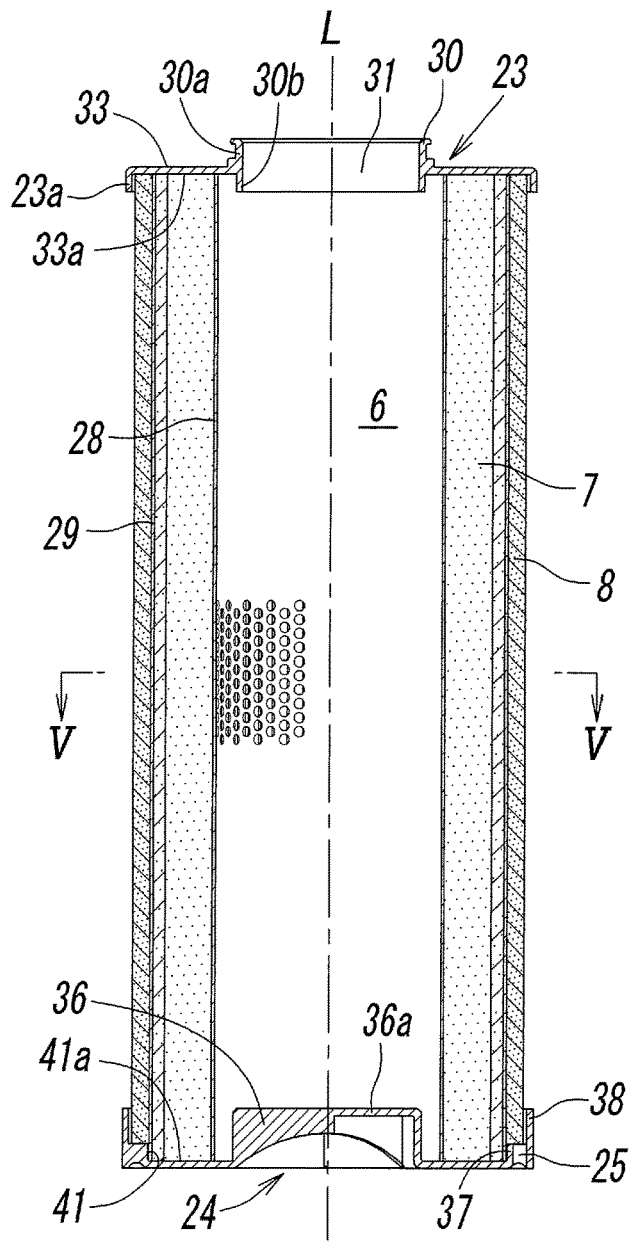
FIG. 3 is a cross-sectional view illustrating a first embodiment of a filter element according to the present invention.
Figure 4:
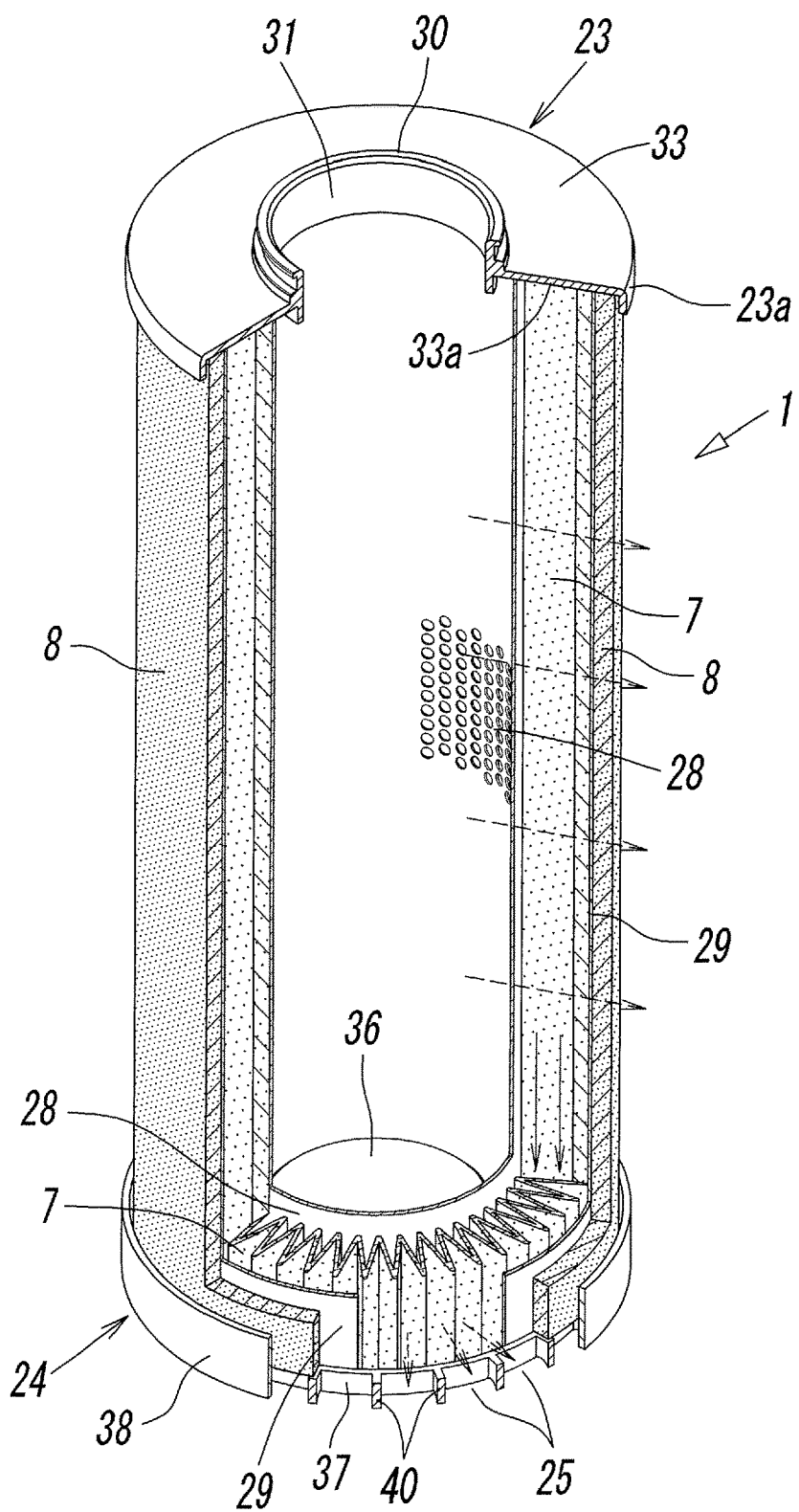
FIG. 4 is a partially cutaway perspective view of the filter element in FIG. 3.
Figure 5:
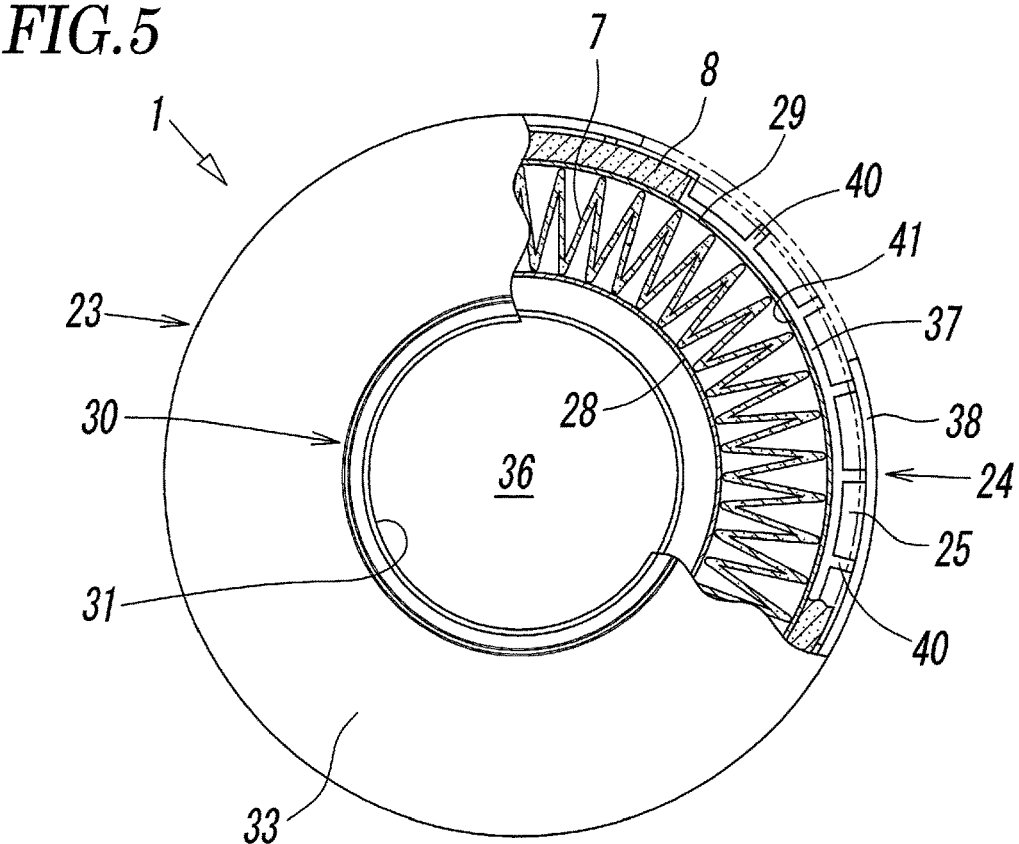
FIG. 5 is a cross-sectional view taken along line V-V in FIG. 3.

FIGS. 1 and 2 illustrate a pneumatic filter employing a filter element 1 according to the present invention. The pneumatic filter is a member in which a hollow filter element 1 is housed inside a housing 2 with a ring-shaped partition member 3 in between so that an axis L is vertically oriented, and as illustrated by broken line arrows in FIG. 1, is configured so that compressed air that has flowed in through an inlet port 4 is introduced into a middle space portion 6 at the middle of the filter element 1, is filtered while passing through from an inner filter member 7 to an outer filter member 8 such that the compressed air having been purified by having liquid, such as oil contents and water contents, and dust removed therefrom flows out to the outside from an outer space portion 9 surrounding an outer peripheral of the filter element 1 through an outlet port 5.

The housing 2 includes a head 11 provided with the inlet port 4 and the outlet port 5 for connecting air pipes, and a hollow housing body 12 connected to a lower portion of the head 11.

The head 11 has a rectangular shape in plan view, and the inlet port 4 is formed in one of the lateral sides of the two opposite lateral sides and the outlet port 5 is formed in the other lateral side. The inlet port 4 is in communication with the middle space portion 6 in the middle of the filter element 1 through an inlet-side flow path 14 formed inside a duct 13, and the outlet port 5 is in communication with the outer space portion 9 formed between an outer periphery of the filter element 1 and an inner periphery of the housing 2 through an outlet-side flow path 15 surrounding the duct 13 and a communication hole 16 formed in the partition member 3.

The housing body 12 has a vertically elongated cylindrical shape, and an upper end portion thereof is open, and a lower end portion is covered with a partially spherical bottom portion 12a that has a downward convex shape.

A flange portion 12b that projects in an outer circumferential direction is formed in the upper end portion of the housing body 12, and the housing body 12 is connected to the head 11 by having the flange portion 12b be, together with a flange portion 3a of an outer periphery of partition member 3, pinched and fixed between an underside of the head 11 and an upper end portion of a securing member 17. Reference numeral 18 in the drawing is a sealing member interposed between the flange portion 12b and the head 11.

The securing member 17 having a ring shape is fitted over an outer periphery of the housing body 12, and is held at a fixing position by being supported from below with a locking member 19 wound and fixed on the outer periphery of the housing body 12 at the fixing position where the flange portions 12b and 3a are pinched with the head 11.

Furthermore, a ring-shaped support block 21 that supports a lower end portion of the filter element 1 is disposed in the vicinity of an inner bottom surface of the housing body 12. A plurality of fin-shaped support walls 21a that radially projects towards the center of the housing body 12 is formed in an inner peripheral surface of the support block 21, lower end portions of the support walls 21a abut against and are locked to the bottom portion 12a of the housing body 12, and the lower end portion of the filter element 1 abuts against and is supported on upper portions of the support walls 21a.

A drain receiver that accumulates liquid, that is, drain collected with the filter element 1 is formed in a space portion 22 below the support block 21, liquid discharge passages 25 formed in a lower end cap 24 of the filter element 1 are in communication with the space portion 22 through liquid discharge holes 25a open at an underside of the lower end cap 24, and the drain collected with the filter element 1 drips into the space portion 22 from the liquid discharge passages 25 through the liquid discharge holes 25a.

A drain discharge valve 26 that discharges the drain accumulated inside the space portion 22 is provided in a center position of a bottom portion of the housing body 12. The drain discharge valve 26 may be a manually operated valve in which a drain discharge port is opened and closed by performing a rotating operation of a drain cock, or may be an automatic valve in which the drain discharge port is opened and closed automatically in accordance with the liquid level of the drain, a pressure of the space portion, or the like; however, in a case using either type of the valves, since the configuration is already known, detailed description thereof is omitted herein.

The filter element 1 will be described in detail next. As illustrated in detail in FIGS. 3 to 6, the filter element 1 includes the hollow inner filter member 7 that surrounds the middle space portion 6 and that has a small diameter, and the hollow outer filter member 8 that surrounds an outer periphery of the inner filter member 7 and that has a large diameter, and the inner filter member 7 and the outer filter member 8 are disposed in a concentric manner and on the inside and outside in a dual manner so as to surround the axis L of the filter element 1.

The inner filter member 7 is positioned upstream with respect to the outer filter member in the flow of the compressed air 8, and mainly collects the dust and liquid, such as oil contents and water contents in the form of mist or droplets, included in the compressed air. The inner filter member 7 is formed by rolling a filter medium folded in a pleated form into a cylindrical shape, and the inner filter member 7 is interposed between an inside support cylinder 28 having a small diameter and an outside support cylinder 29 having a large diameter that are formed with a punching metal and in a concentric manner with respect to the inside support cylinder 28 and the outside support cylinder 29.

Since the inner filter member 7 is folded in a pleated form, the filter area is increased compared with a filter member formed by just rolling a flat sheet-shaped filter medium. However, in a case in which there is no need to enlarge the filter area as much, a normal filter member formed by rolling a flat sheet-shaped filter medium in a cylindrical shape can be used.

Meanwhile, the outer filter member 8 is positioned downstream with respect to the inner filter member 7 in the flow of the compressed air and mainly functions to guide the liquid, such as the oil contents and the water contents, collected with the inner filter member 7 to the lower end cap, and is disposed around an outer periphery of the outside support cylinder 29 so as to surround the outer periphery of the inner filter member 7 with the outside support cylinder 29 interposed therebetween.

The inner filter member 7 and the outer filter member 8 can be formed with, for example, a fiber sheet formed by regularly or irregularly layering fine synthetic fibers having a diameter of about a few micrometers to about a few ten micrometers, nonwoven fabric formed by binding layered synthetic fibers with an adhesive or by a method such as fusing or entwining, an aggregate of ceramic fine particles, or a porous sheet made of synthetic resin. Furthermore, by decreasing the porosity (roughness) by using a fiber that has a diameter that is smaller than that of the outer filter member 8, the inner filter member 7 is formed fine to a degree allowing the fine dust and fine mist, such as the oil contents or the water contents, to be reliably collected, and on the other hand, by increasing the porosity (roughness) by using a fiber that has a diameter that is larger than that of the inner filter member 7, the outer filter member 8 is formed so as to be capable of promptly guiding liquid, such as the oil contents and the water contents, collected by the inner filter member 7 to the lower end cap 24. Accordingly, the inner filter member 7 may be a filter member with a narrow mesh, and the outer filter member 8 may be a filter member with a coarse mesh.

An annular upper end cap 23 is fixed to upper end portions of the inner filter member 7 and the outer filter member 8 with an adhesive, and the round saucer-shaped lower end cap 24 is attached to lower end portions of the inner filter member 7 and the outer filter member 8. The lower end cap 24 can be fixed with an adhesive as well.

A communication pipe 30 that includes an introduction port 31 and that is formed so as to protrude in both the upper and lower directions of the upper end cap 23 is formed at the center of the upper end cap 23, and the upper-half portion 30a of the communication pipe 30 is, as illustrated in FIG. 1, connected to a lower end portion of the duct 13 through a sealing member 32 in an airtight manner. With the above, the inlet-side flow path 14 inside the duct 13 and the middle space portion 6 inside the inner filter member 7 are connected to each other with the introduction port 31 such that the compressed air from the inlet port 4 is introduced into the middle space portion 6.

Furthermore, an outer peripheral wall 23a that extends downwards towards the lower end cap 24 side is formed in an outer peripheral edge of the upper end cap 23 in a diameter direction, and an inner peripheral surface of the partition member 3 abuts against an outer peripheral surface of the outer peripheral wall 23a. An annular cover portion 33 is formed between a lower-half portion 30b of the communication pipe 30 and the outer peripheral wall 23a, and the upper portions of the inside support cylinder 28, the inner filter member 7, the outside support cylinder 29, and the outer filter member 8 are fitted inside the cover portion 33 and are abutted against a flat inner bottom surface 33a of the cover portion 33.

Figure 7:
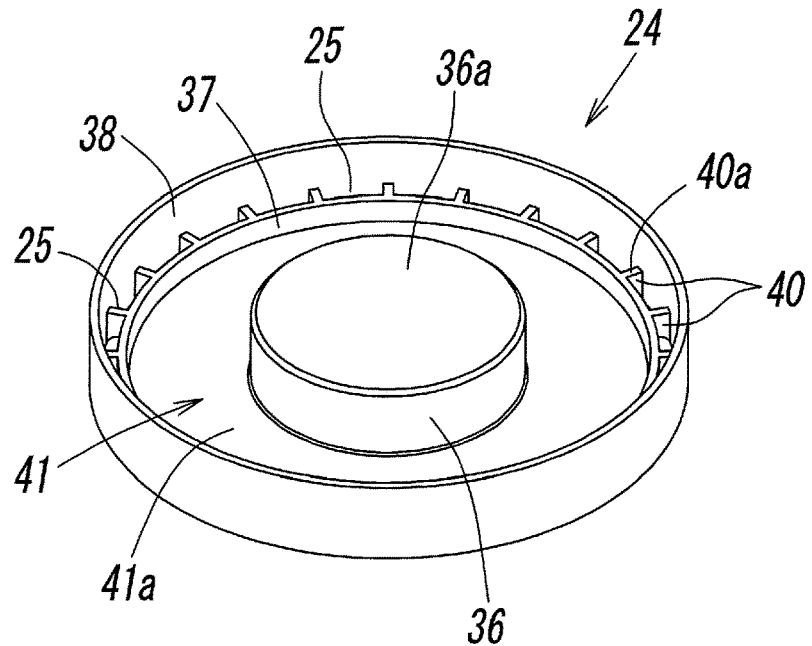
FIG. 7 is a perspective view of a lower end cap.
Figure 8:
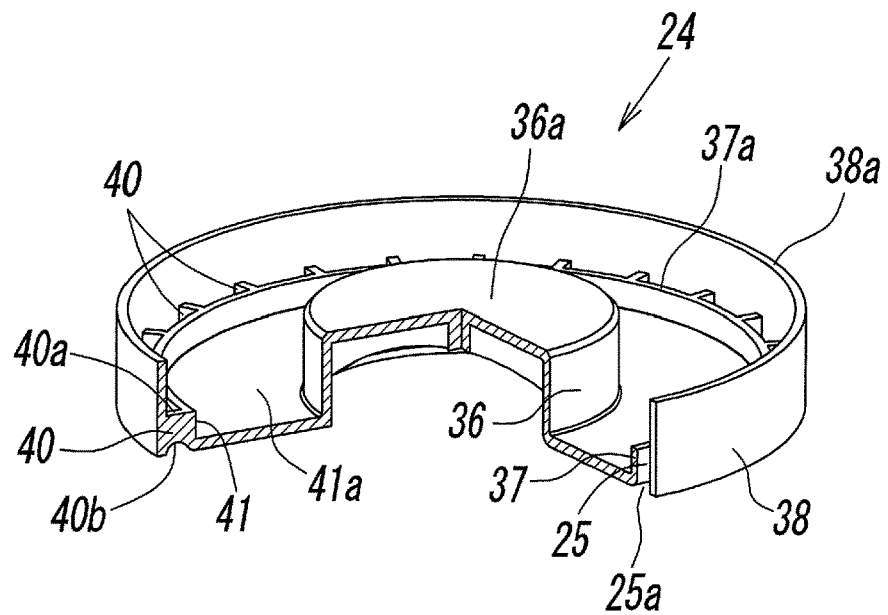
FIG. 8 is a partially cutaway perspective view of FIG. 7.

Meanwhile, the lower end cap 24 closes a lower end portion of the middle space portion 6, and as it is apparent from FIGS. 7 and 8, includes a columnar center protrusion 36 that is positioned at the center of the upper surface of the lower end cap 24 and that fits inside the middle space portion 6, an annular inner wall 37 formed at a position slightly inside an outer peripheral edge of the lower end cap 24 so as to surround the center protrusion 36, an annular outer wall 38 formed at the outer peripheral edge of the lower end cap 24 so as to surround the inner wall 37 with a gap in between, the liquid discharge passages 25 formed between the inner wall 37 and the outer wall 38, and the liquid discharge holes 25a that are open in the underside of the lower end cap 24 and that are in communication with the liquid discharge passages 25.

The center protrusion 36, the inner wall 37, and the outer wall 38 extend parallel to the axis L towards the upper end cap 23 side, and a height Ho of the outer wall 38 is larger than a height Hi of the inner wall 37 and is the same as a height of the center protrusion 36. Accordingly, an upper end surface 38a of the outer wall 38 is positioned above an upper end surface 37a of the inner wall 37, in other words, is positioned higher in the axis L direction. An upper end surface 36a of the center protrusion 36 is a horizontal surface.

An outer peripheral surface of the inner wall 37 and an inner peripheral surface of the outer wall 38 are connected to each other with a plurality of radially positioned rib-shaped connection walls 40, and the liquid discharge passage 25 and the liquid discharge hole 25a are formed between adjacent connection walls 40 and 40. Upper end surfaces 40a of the connection walls 40 are at a height that is the same as that of the upper end surface 37a of the inner wall 37, are formed horizontally, and lower end surfaces 40b of the connection walls 40 are each formed so as to have a curved surface that curves upwards.

Accordingly, the liquid discharge passages 25 are formed at positions that are lower than a wall portion 38b of the outer wall 38 that extends above the inner wall 37.

Furthermore, lower end portions of the inside support cylinder 28, the inner filter member 7, and the outside support cylinder 29 fit inside an annular liquid retaining chamber 41 surrounded by the center protrusion 36 and the inner wall 37, each of the lower end portions abuts against a flat inner bottom surface 41a of the liquid retaining chamber 41, and an outer periphery of the lower end portion of the inner filter member 7 is surrounded by the inner wall 37 with the outside support cylinder 29 in between. Accordingly, the lower end portions of the inside support cylinder 28, the inner filter member 7, and the outside support cylinder 29 are aligned at the same position in the axis L direction.

An outer peripheral surface of the outside support cylinder 29 in contact with an inner peripheral surface of the inner wall 37 may be disposed close to the inner peripheral surface with a slight gap in between.

Meanwhile, a lower end portion of the outer filter member 8 is positioned above a lower end portion of the inner filter member 7 and abuts against the upper end surface 37a of the inner wall 37 and the upper end surfaces 40a of the connection walls 40, or is disposed so as to be in a close state with a slight gap in between, and an outer periphery of the lower end portion of the outer filter member 8 is surrounded by the wall portion 38b of the outer wall 38.

A gap 42 is formed between the outer periphery of the lower end portion of the outer filter member 8 and an inner periphery of the outer wall 38, and by having the gap 42 be in communication with the liquid discharge passages 25, the space portion 22 at a lower end of the housing body 12 is in communication with the outer space portion 9 with the liquid discharge passages 25 and the gap 42 in between. However, the lower end portion of the outer filter member 8 may cover the entire upper surface of the liquid discharge passages 25 by having the outer periphery of the lower end portion of the outer filter member 8 be in contact with the inner periphery of the outer wall 38 without providing the gap 42.

The reason for having the height Ho of the outer wall 38 be higher than the height Hi of the inner wall 37 is to prevent the collected liquid from being scattered once more by partially reducing the flow velocity of the compressed air passing near the lower end portions of the inner filter member 7 and the outer filter member 8. In other words, in a case in which the flow velocity of the compressed air is high, the high-density liquid contained near the lower end portions of the inner filter member 7 and the outer filter member 8, and the accumulated liquid inside the lower end cap 24 are scattered by being in contact with the flow of the compressed air and are easily mixed once more into the compressed air that has been purified. In particular, when the liquid inside the liquid retaining chamber 41 flow over the inner wall 37, liquid positioned on an upper end surface of the inner wall 37 and liquid that has permeated the lower end portion of the outer filter member 8 are conveyed by the fast flow of the compressed air and are easily scattered.

Figure 6:
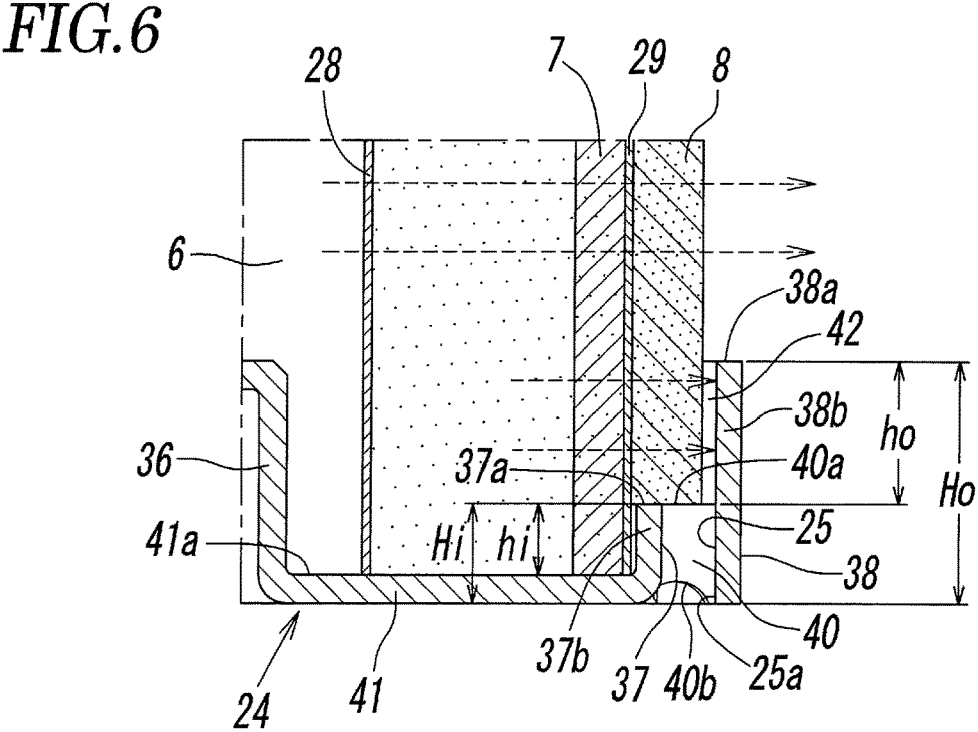
FIG. 6 is an enlarged view of an essential portion of FIG. 3.

Accordingly, as it is apparent from FIG. 6, by having the height Ho of the outer wall 38 be higher than the height Hi of the inner wall 37, the flow of the compressed air passing near the lower end portions of the inner filter member 7 and the outer filter member 8 is blocked with the wall portion 38b of the outer wall 38 such that the flow velocity of that portion is reduced; accordingly, the accumulated liquid inside the lower end cap 24, the liquid flowing over the inner wall 37, or the high-density liquid contained near the lower end portions of the inner filter member 7 and the outer filter member 8 is prevented from being scattered by coming in contact with the flow of the compressed air such that the liquid is prevented from being mixed once more into the compressed air that has been purified.

Such a liquid scattering preventing effect can be obtained by, as described above, having the height Ho of the outer wall 38 be higher than the height Hi of the inner wall 37; however, in order to increase the effect, a vertical width ho of the wall portion 38b of the outer wall 38 that surrounds the lower end portion of the outer filter member 8 is preferably 0.5 times or more than a vertical width hi of the wall portion 37b of the inner wall 37 surrounding the lower end portion of the inner filter member 7 and, more preferably, the vertical width ho of the wall portion 38b is the same as or larger than the vertical width hi of the wall portion 37b. In the example illustrated in the drawing, the vertical width ho of the wall portion 38b is twice the vertical width hi of the wall portion 37b.

A pneumatic filter including the above configuration is connected to an inside of a pneumatic circuit, and filters compressed air supplied to a pneumatic actuator, such as a pneumatic cylinder or a pneumatic motor. An operation in the above case is as follows.

When compressed air is introduced from the inlet port 4 through the inlet-side flow path 14 and the communication hole 16 to the middle space portion 6 in the middle of the filter element 1, the compressed air successively passes through the porous inside support cylinder 28 through the inner filter member 7, the porous outside support cylinder 29, and the outer filter member 8 and reaches the outer space portion 9, and in the course of the above, dust and liquid, such as oil contents and water contents, in the compressed air are removed with the inner filter member 7 and the outer filter member 8. In so doing, the inner filter member 7 mainly functions to collect the dust and the liquid, in the form of mist or droplets, and the outer filter member 8 mainly functions to guide the liquid collected with the inner filter member 7 to the lower end cap 24. Subsequently, the purified compressed air flows from the outer space portion 9, through the outlet-side flow path 15 and the communication hole 16 formed in the partition member 3, and out of the outlet port 5.

The liquid collected in the inner filter member 7 that has first been fine particles gradually becomes condensed into large particles and accordingly, flows down along the inner filter member 7 and the outer filter member 8 due to the effect of gravitational force, and while flowing down, is merged together into larger liquid particles and reaches the lower end cap 24.

After being temporality retained inside the liquid retaining chamber 41 of the lower end cap 24, the liquid that has flowed down along the inner filter member 7 gradually flows over the inner wall 37 owing to the following liquid flowing down and, in the liquid discharge passages 25, flows along the outer peripheral surface of the inner wall 37 and the connection walls 40 and drips into the space portion 22.

Furthermore, although the liquid that has flowed down along the outer filter member 8 flows, in the liquid discharge passages 25, along the outer peripheral surface of the inner wall 37, the lateral sides of the connection walls 40, the inner peripheral surface of the outer wall 38, or the like and drips into the space portion 22, the liquid may drop directly through the inside of the liquid discharge passages 25 from a lower end surface of the outer filter member 8.

In the above, since the lower end surfaces 40*b* of the connection walls 40 curve upwards, the liquid flowing along the connection walls 40 flows along the lower end surfaces 40*b*, flows to the inner wall 37 side of the outer wall 38 side, and drips from the lower end portion of the inner wall 37 or the outer wall 38.

Furthermore, in the flow of the compressed air passing through the middle space portion 6 to the inner filter member 7 and the outer filter member 8, the flow passing near the lower end portions of the inner filter member 7 and the outer filter member 8 is blocked by the wall portion 38*b* of the outer wall 38, and the flow velocity thereof is decreased. Accordingly, the accumulated liquid inside the liquid retaining chamber 41 of the lower end cap 24, the liquid flowing over the inner wall 37, or the high-density liquid contained near the lower end portions of the inner filter member 7 and the outer filter member 8 is not scattered by the flow of the compressed air; accordingly, no scattered liquid is mixed again into the compressed air that has been purified.

The drain accumulated inside the space portion 22 of the bottom portion of the housing 2 is discharged as required by opening the drain discharge valve 26.

Figure 9:
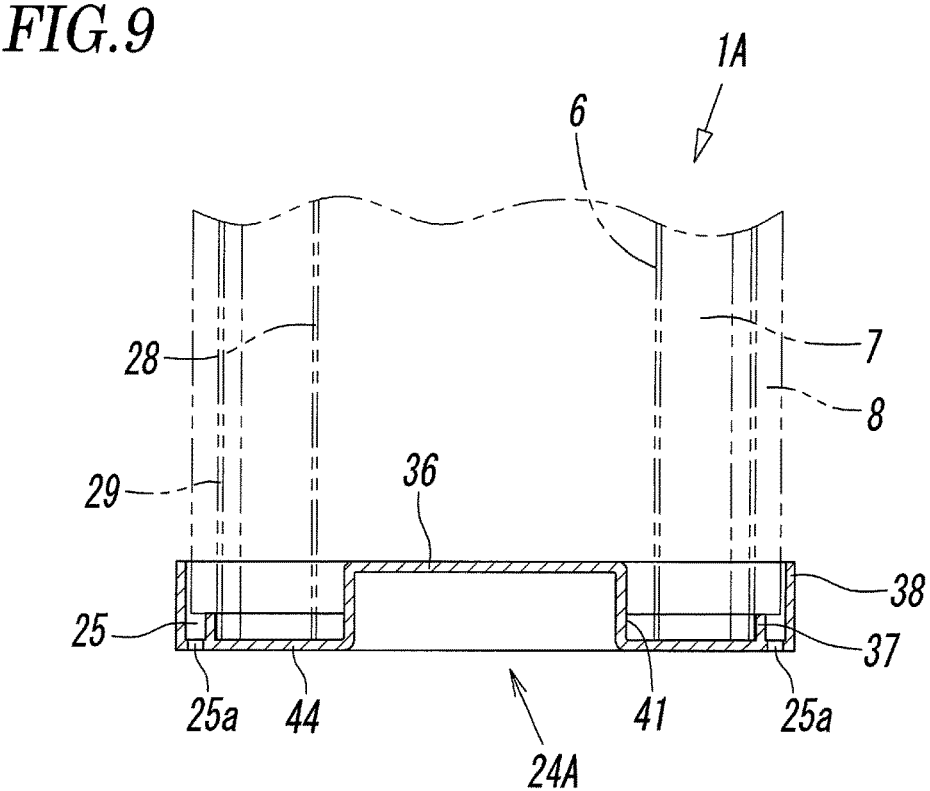
FIG. 9 is a cross-sectional view of an essential portion of a second embodiment of a filter element.

FIG. 9 illustrates a cross-section of a lower end portion of a filter element of a second embodiment. In a filter element 1A of the second embodiment, a configuration of a lower end cap 24A is different from the configuration of the lower end cap 24 of the filter element 1 of the first embodiment. In other words, in the lower end cap 24A, the inner wall 37 and the outer wall 38 are formed in a concentric manner on a bottom wall 44, an annular liquid discharge passage 25 continuous across the entire circumference is formed between the inner wall 37 and the outer wall 38, and a single or a plurality of liquid discharge holes 25*a* that open the liquid discharge passage 25 to the underside of the lower end cap 24A are formed in the bottom portion of the liquid discharge passage 25.

Other configurations of the filter element 1A are the same as those of the filter element 1 of the first embodiment.

Figure 10:
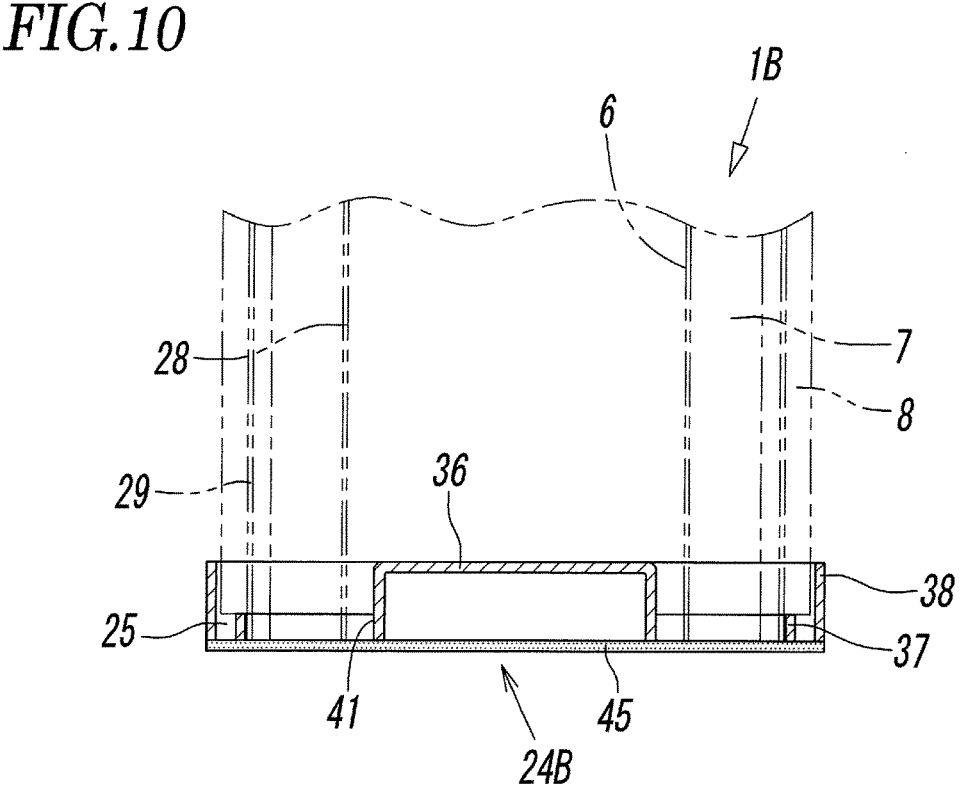
FIG. 10 is a cross-sectional view of an essential portion of a third embodiment of a filter element.

FIG. 10 illustrates a cross-section of a lower end portion of a filter element of a third exemplary embodiment. In a filter element 1B of the third embodiment, a configuration of a lower end cap 24B is different from the configuration of the lower end cap 24 of the filter element 1 of the first embodiment. In other words, in the lower end cap 24B, the inner wall 37, the outer wall 38, and the center protrusion 36 are integral in a concentric manner on a porous bottom wall 45 formed of a sintered metal compact, and the annular liquid discharge passage 25 formed between the inner wall 37 and the outer wall 38 is in communication with the underside of the lower end cap 24B having the continuous pores inside the bottom wall 45 serve as liquid discharge holes 25*a*.

Other configurations of the filter element 1B are the same as those of the filter element 1 of the first embodiment.

Note that the porous bottom wall 45 may be provided only in the bottom portion of the annular liquid discharge passage 25, and the bottom portions of the liquid retaining chamber 41 and the center protrusion 36 may be bottom walls with no holes.

Figure 11:
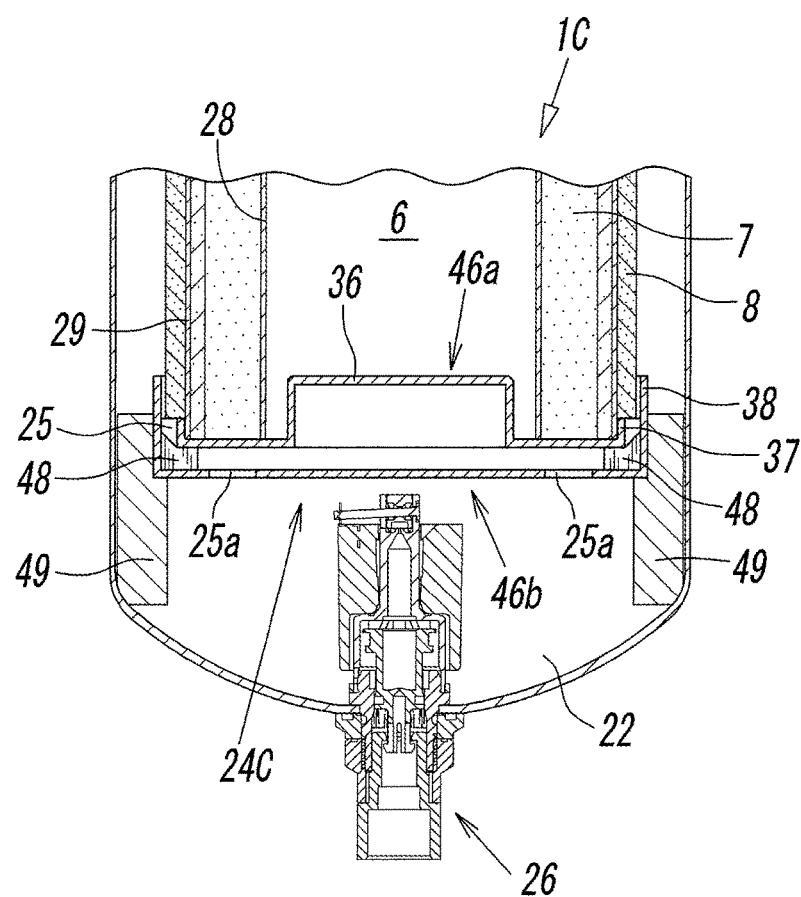
FIG. 11 is a cross-sectional view illustrating an essential portion of a fourth embodiment of a filter element, and is a drawing in a state in which a filter element is incorporated in a pneumatic filter.

FIG. 11 illustrates a lower end portion of a filter element of a fourth embodiment, and is a cross-section in a state in which a filter element 1C is incorporated in a pneumatic filter. In the filter element 10, a lower end cap 24C is formed by an inner cap member 46*a* and an outer cap member 46*b* that are configured separately and that fit with each other.

The inner cap member 46*a* is a member that covers the lower end portion of the middle space portion 6, and includes the center protrusion 36 and the inner wall 37. On the other hand, the outer cap member 46*b* is a saucer-shaped member and includes the outer wall 38 and the liquid discharge holes 25*a*, and further radially includes, on the inner peripheral surface, a plurality of rib-shaped inner support walls 48 that support the outer periphery of the lower end portion of the inner cap member 46*a*. Furthermore, a rib-shaped outer support wall 49 that is locked to the inside of the housing body 12 is radially attached on an outer surface of the outer cap member 46*b*, and with the above, the outer cap member 46*b* also functions as a support block that supports a lower end portion of the filter element 1C inside the housing body 12. The liquid discharge passage 25 is formed between the inner wall 37 and the outer wall 38.

Note that the bottom wall of the outer cap member 46*b* may be formed so as to have a conical surface and the liquid discharge hole 25*a* may be provided in the middle portion thereof.

By configuring the outer cap member 46*b* to have no outer support walls 49, the function as the support block can be eliminated so as to be configured to only have the function as the lower end cap 24C.

Furthermore, the inner cap member 46*a* and the outer cap member 46*b* can be separable with respect to each other; however, the inner cap member 46*a* and the outer cap member 46*b* can be integrally formed by binding each other with the inner support wall 48.

Since other configurations of the filter element 1C of the fourth embodiment are the same as those of the filter element 1 of the first embodiment, main configurations of the two that are the same are denoted with the same reference numerals as those of the first embodiment and description thereof are omitted.

Note that in the embodiment illustrated in the drawings, while the cross-sectional shape of the filter element 1 has a round shape, the cross-sectional shape may be a shape other than a round shape. For example, it may be a polygon, such as a square or a hexagon, and in such a case, the upper end cap and the lower end cap are formed so as to have a similar shape.

Furthermore, in each of the embodiments described above, a hollow pre-filter that removes, in advance, relatively large dust included the compressed air to protect the inner filter member 7 can be disposed in the filter element. The pre-filter may be disposed either inside or outside of the inside support cylinder 28.

Moreover, in the embodiments, the inner filter member 7 is formed so as to be meshed finely, and the outer filter member 8 is formed so as to be meshed coarsely; however, conversely, the inner filter member 7 may be formed so as to be meshed coarsely, and the outer filter member 8 may be formed so as to be meshed finely.

REFERENCE SIGNS LIST 1, 1A, 1B, 1C filter element
2 housing
4 inlet port
5 outlet port
6 middle space portion
7 inner filter member
8 outer filter member
11 head
12 housing body
23 upper end cap
24, 24A, 24B, 24C lower end cap
25 liquid discharge passage
25a liquid discharge hole
31 introduction port
37 inner wall
37a upper end surface
37b wall portion
38 outer wall
38a upper end surface
38b wall portion
40 connection walls
41 liquid retaining chamber
46a inner cap member
46b outer cap member
Hi height of inner wall
Ho height of outer wall
hi vertical width of wall portion of inner wall
ho vertical width of wall portion of outer wall

The invention claimed is:

1. A hollow filter element for removing dust and liquid mixed in compressed air, the filter element comprising:
an inner filter member that surrounds a middle space portion; and an outer filter member that surrounds an outer periphery of the inner filter member, wherein the compressed air introduced into the middle space portion is filtered while passing through the inner filter member to the outer filter member such that dust and liquid are removed,
wherein an upper end cap including an introduction port for introducing the compressed air into the middle space portion is attached to upper end portions that are first ends of the inner filter member and the outer filter member in an axis direction,
wherein a lower end cap that closes a lower end portion of the middle space portion is attached to lower end portions that are second ends of the inner filter member and the outer filter member in the axis direction,
wherein an outer periphery of the lower end portion of the inner filter member is surrounded by an inner wall formed in the lower end cap, wherein an outer periphery of the lower end portion of the outer filter member is surrounded by an outer wall that blocks a flow of the compressed air, and wherein an upper end surface of the outer wall is positioned higher than an upper end surface of the inner wall,
wherein a vertical width of a wall portion of the outer wall that is above the inner wall and that surrounds an outer periphery of the outer filter member is larger than a vertical width of a wall portion of the inner wall that surrounds the outer periphery of the inner filter member,
wherein a liquid discharge passage for discharging liquid collected by the inner filter member and the outer filter member to an outside is formed between the outer wall and the inner wall, and wherein the liquid discharge passage is in communication with a liquid discharge hole that opens to an underside of the lower end cap and wherein the lower end portion of the outer filter member abuts against the upper end surface of the inner wall.

2. The filter element according to claim 1, wherein the lower end portion of the outer filter member is positioned higher than the lower end portion of the inner filter member, and, is positioned at a position similar to that of the upper end surface of the inner wall.

3. The filter element according to claim 2, wherein a gap in communication with the liquid discharge passage is formed between an inner peripheral surface of the outer wall and an outer peripheral surface of the outer filter member.

4. The filter element according to claim 1, wherein the outer wall is formed in the lower end cap so as to surround the inner wall, and the outer wall and the inner wall are connected to each other with a plurality of radially disposed rib-shaped connection walls.

5. The filter element according to claim 1, wherein the lower end cap includes an inner cap member and an outer cap member that are configured separately and that fit with each other, the inner wall being formed in the inner cap member, and the outer wall and the liquid discharge hole being formed in the outer cap member.

6. A pneumatic filter comprising: a housing including a head including an inlet port and an outlet port and a hollow housing body connected to the head; and a hollow filter element housed inside the housing body so that an axis is oriented vertically, wherein the filter element includes an inner filter member that surrounds a middle space portion, and an outer filter member that surrounds an outer periphery of the inner filter member, and wherein compressed air that is introduced into the middle space portion from the inlet port is filtered while passing through the inner filter member to the outer filter member and flows out from the outlet port,
wherein an upper end cap including an introduction port connecting the inlet port and the middle space portion is attached to upper end portions of the inner filter member and the outer filter member of the filter element, and wherein a lower end cap that closes a lower end portion of the middle space portion is attached to lower end portions of the inner filter member and the outer filter member,
wherein an outer periphery of the lower end portion of the inner filter member is surrounded by an inner wall formed in the lower end cap, wherein an outer periphery of the lower end portion of the outer filter member is surrounded by an outer wall that blocks a flow of the compressed air, and wherein an upper end surface of the outer wall is positioned higher than an upper end surface of the inner wall,
wherein a vertical width of a wall portion of the outer wall that is above the inner wall and that surrounds an outer periphery of the outer filter member is larger than a vertical width of a wall portion of the inner wall that surrounds the outer periphery of the inner filter member,
wherein a liquid discharge passage for discharging a liquid collected by the inner filter member and the outer filter member to an inside of the housing body is formed between the outer wall and the inner wall, and wherein the liquid discharge passage is in communication with a liquid discharge hole that opens to an underside of the lower end cap and wherein the lower end portion of the outer filter member abuts against the upper end surface of the inner wall.

7. The pneumatic filter according to claim 6, wherein the lower end portion of the outer filter member is positioned higher than the lower end portion of the inner filter member, and, is positioned at a position similar to that of the upper end surface of the inner wall.

8. The pneumatic filter according to claim 7, wherein a gap in communication with the liquid discharge passage is formed between an inner peripheral surface of the outer wall and an outer peripheral surface of the outer filter member.

9. The pneumatic filter according to claim 6, wherein the outer wall is formed in the lower end cap so as to surround the inner wall, and the outer wall and the inner wall are connected to each other with a plurality of radially disposed rib-shaped connection walls.

10. The pneumatic filter according to claim 6, wherein the lower end cap includes an inner cap member and an outer cap member that are configured separately and that fit with each other, the inner wall being formed in the inner cap member, and the outer wall and the liquid discharge hole being formed in the outer cap member.

11. The pneumatic filter according to claim 10, wherein the outer cap member being locked to the inside of the housing body also serves as a support block that supports a lower end portion of the filter element.

* * * * *